United States Patent

Audiffred, Jr. et al.

[11] 3,882,738
[45] May 13, 1975

[54] SIMPLIFIED FLUID CIRCUIT FOR SHIFTING A TRANSMISSION

[75] Inventors: Sidney J. Audiffred, Jr., Washington; Harold A. Mathes, Tremont, both of Ill.

[73] Assignee: Caterpillar Tractor Company, Peoria, Ill.

[22] Filed: Dec. 3, 1973

[21] Appl. No.: 421,065

[52] U.S. Cl. .................. 74/753; 74/754; 192/87.13; 192/87.19
[51] Int. Cl. ...................... F16h 57/10; F16d 25/00
[58] Field of Search ...................... 74/753, 754, 364; 192/87.13, 87.19, 109

[56] References Cited
UNITED STATES PATENTS

| | | | |
|---|---|---|---|
| 3,091,976 | 6/1953 | Johnson et al. | 74/364 |
| 3,181,394 | 5/1965 | Ramsel et al. | 74/753 X |
| 3,444,762 | 5/1969 | Golan et al. | 74/754 |
| 3,468,194 | 9/1968 | Horsch et al. | 192/87.13 X |
| 3,481,435 | 12/1969 | Pearee et al. | 74/754 X |
| 3,596,536 | 8/1971 | Starling | 74/753 |
| 3,709,065 | 1/1973 | Starling | 74/753 |

*Primary Examiner*—Samuel Scott
*Assistant Examiner*—P. S. Lall
*Attorney, Agent, or Firm*—Phillips, Moore, Weissenberger, Lempio & Strabala

[57] ABSTRACT

A hydraulic system responsive to movement of a shift lever actuates predetermined pairs of drive establishing devices in a vehicle transmission by applying a gradual fluid pressure rise to one such device to provide a selected drive ratio and by applying a delayed lesser gradual pressure rise to the other device of the pair to determine drive direction and to reestablish power flow through the transmission. The circuit also blocks fluid pressure from at least one of the pair of devices if the vehicle engine is started up with the control lever at a position other than neutral and neutralizes the transmission when the vehicle brakes are applied but maintains full fluid pressure at other vehicle components, such as the brakes, under both conditions. These functions including resetting at the beginning of each shift are all accomplished within a pair of selector valves, a pressure modulation valve assembly and a single spool safety differential valve in a compact, simplified and economically manufactured arrangement having a reduced number of separate components.

10 Claims, 7 Drawing Figures

Fig_5_

Fig_3_

SIMPLIFIED FLUID CIRCUIT FOR SHIFTING A TRANSMISSION

BACKGROUND OF THE INVENTION

This invention relates to multispeed drive transmissions of the kind having fluid pressure operated drive establishing devices, and more particularly to fluid circuits for shifting such transmissions in response to movement of an operator's shift lever or the like.

A selected drive ratio and drive direction in certain forms of transmission are established by applying fluid pressure to predetermined ones of internal drive establishing devices, which may be either clutches or brakes depending on the design of the particular transmission. In a typical transmission of this kind, a selected one of a first group of such devices is pressurized to establish a drive ratio and one of a second group of devices is pressurized to determine drive direction. To avoid severe shocks and to reduce stresses and wear, the control system is arranged to apply the fluid pressures in a gradual or modulated manner. Further, one of the two groups of drive establishing devices, usually the directional devices, are made larger and more wear resistant and the control system is arranged to delay the rise of pressure at the selected device of that group relative to pressurizing of the selected device of the first group so that the higher capacity device is always the one which sustains the shock of reestablishing torque flow through the transmission.

To further reduce shocks and wear and for safety reasons, the control systems are often designed to provide still additional functions. These additional functions may include automatic blocking of pressure from one of the selected drive conditioning devices in the event that the associated engine is started up while the gear shift lever or the like is at a position other than neutral. It may also be desirable to provide for automatic neutralization of the transmission when the vehicle brakes are first applied. Further, whether the transmission is put into a neutral condition deliberately or automatically in response to braking, it is desirable that the fluid pressure from the source supplying the system be maintained at a high value while the transmission is neutralized as the same fluid pressure may be required to operate other vehicle components, such as brakes or steering clutches.

Prior transmission control systems of the general type under discussion are disclosed, for example, in U.S. Pat. Nos. 3,091,976; 3,468,194; 3,481,435; 3,596,536 and 3,709,065. Systems of this kind have two selector valves for routing fluid to the speed and directional drive establishing devices and the basic functions of modulating the pressure rise and of delaying the pressure rise applied to one of the selected devices are generally performed by two additional complex spool valve assemblies which may be termed the modulating valve and the differential valve respectively. In order to realize the various additional system functions discussed above, it has been necessary to still further complicate the system with additional separable valving components for such purposes as sensing when the transmission control lever or the like is in neutral, forcing a neutralized condition of the transmission in response to fluid signals from other vehicle components such as the brakes, and for maintaining fluid pressure at a high valve when the transmission is in neutral, Still further, additional separable components have been required for the purpose of resetting the modulation valve at the beginning of each shift. Certain mechanisms employed for these purposes have necessitated much precision machining of internal surface of valve housing and this adds substantial cost.

For the reason discussed above, transmission control systems have tended to be very complex and costly or else have been limited in the number of desirable functions which are realized.

SUMMARY OF THE INVENTION

This invention provides a simplified transmission control circuit in which functions that have heretofore required complex and costly additional components are realized within the two selector valves, the modulation valve and the differential valve. The resetting function, sensing of a neutral setting of the transmission control lever or the like, forced neutralization in response to a braking signal or the like, and maintenance of high fluid pressure in the system during the neutralized condition are all controlled by a differential valve which requires only a single spool for these purposes and the system requires relatively little costly machining of internal surfaces of valve housings.

Accordingly, it is an object of this invention to provide a more compact transmission control system which performs desirable functions with a reduced number of separable parts and with reduced requirements for costly machining in manufacture.

The invention together with further objects and advantages thereof will best be understood by reference to the following description of a preferred embodiment taken in conjunction with the accompanying drawings.

DESCRIPTION OF A PREFERRED EMBODIMENT

Figure 1:
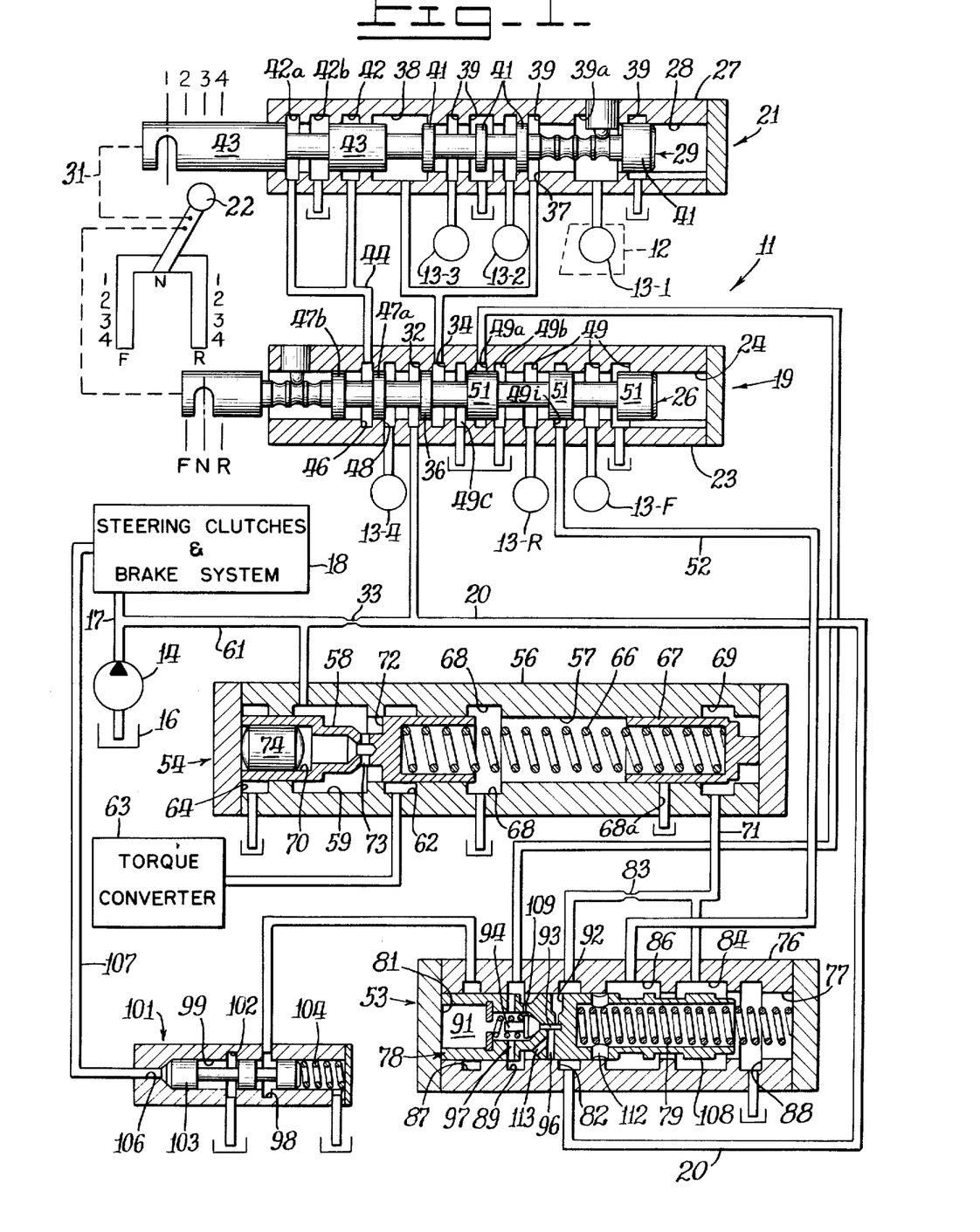
FIG. 1 illustrates a transmission control system embodying the invention with certain components being shown in section and certain other components being shown diagrammatically, with all elements being in the positions occupied when the system is shut down with no fluid pressure being supplied thereto.

Referring initially to FIG. 1 of the drawings, a control system 11 is shown adapted to control a vehicle transmission 12 of the kind which includes a series of fluid pressure actuated drive establishing devices 13, which may variously be clutches or brakes, wherein pressurization of selected combinations of the devices 13 enables realization of one of a plurality of drive ratios and provides for either forward or reverse drive through the transmission. Both the transmission 12 and devices 13 are shown schematically in FIG. 1 inasmuch as suitable detailed constructions for such transmissions and drive establishing devices are well known to the art. In a common form of such transmissions, the devices 13 are functionally separable into two groups, one group being the drive establishing devices 13-1, 13-2, 13-3 and 13-4 that determine the gear ratio through the transmission and the other group consisting of the drive establishing devices 13-F and 13-R which determine the drive direction through the transmission.

To realize a selected drive condition within the transmission, a particular one of the first group of drive establishing devices 13-1 through 13-4 is pressurized to establish the selected gear ratio while a single one of the second group of drive devices 13-F and 13-R is also pressurized to determine whether the drive to the vehicle wheels will be in the forward or reverse direction. Thus, to shift the transmission 12, pressurized ones of the devices 13 are depressurized and then fluid pressure is reapplied to a pair of the devices which pair includes one device from each group.

Fluid pressure for actuating the devices 13 is normally obtained from a pump 14 driven by the engine of the associated vehicle and which draws fluid, such as oil for example, from a reservoir 16. In addition to providing pressurized operating fluid for the transmission control system 11, the outlet 17 of pump 14 may also be connected with various other vehicle components, such as the steering clutch and brake system 18 in this particular example, which also require pressurized fluid.

Directional and speed selector spool valves 19 and 21 respectively serve to direct fluid from a supply conduit 20, connected to outlet 17 of pump 14, to predetermined ones of the devices 13 in accordance with the setting of a shift control which may be a conventional operator's shift lever 22, for example. Directional selector valve 19 has a housing 23 with a bore 24 therein in which a valve spool 26 is movable in an axial direction between three positions corresponding to Forward drive, Neutral and Reverse drive. Speed selector valve 21 also has a housing 27 with a bore 28 in which a spool 29 is shiftable axially between four settings. The particular transmission 12 for which this system is adapted has four speed settings in both forward and reverse, in addition to a neutral setting. Thus, shift lever 22 is arranged to have nine positions and through suitable shift linkage 31, detailed constructions for which are well known to the art, movement of the shift lever enables the operator to adjust both valve spools 26 and 29 to a desired setting. In this transmission 12, device 13-1, 13-2, 13-3, or 13-4 is pressurized to realize the first to fourth speeds respectively while pressurization of device 13-F establishes forward drive through the transmission and pressurization of device 13-R establishes reverse drive.

Pressurized fluid from outlet 17 of pump 14 is transmitted to supply conduit 20 through a flow restriction 33 and then to an inlet groove 32 in bore 24 of directional selector valve 19. At the forward and reverse positions of spool 26, pressurized fluid is transmitted from groove 32 to an adjacent outlet groove 34 while a land 36 on spool 26 blocks groove 34 from inlet groove 32 at the neutral setting of the spool. Outlet groove 34 is in turn communicated with a pair of spaced apart grooves 37 and 38 of bore 28 of the speed selector valve 21. Thus, the speed selector valve 21 receives pressurized fluid only when the operator's shift lever 22 is in one of the forward or reverse drive positions, but does not receive fluid when the shift lever is at the neutral position.

Speed selector valve 21 has additional bore grooves 39 and spool lands 41 arranged to direct fluid from inlet grooves 38 or 39 to devices 13-1, 13-2, and 13-3 at the first, second, and third speed positions respectively of the valve spool 29 and to vent the other two such devices at each position. Two additional grooves 42 and spool lands 43 are provided in the speed selector valve 21 to vent a flow conduit 44 at the first three speed positions of spool 29 while communicating inlet groove 38 to conduit 44 at the fourth speed position. Conduit 44 communicates with a groove 46 of the directional selector valve 19 which has a pair of spool lands 47a and 47b arranged to coact with land 36 to communicate conduit 44 with a groove 48 at both the forward and reverse settings of spool 26, but not at the neutral setting thereof. Groove 48 is in turn communicated with the fourth speed establishing device 13-4. Thus, while device 13-4 is connected to the directional selector valve 19, it is effectively controlled by the position of the spool 29 of the other selector valve 21, just as the devices 13-1, 13-2 and 13-3 are controlled thereby, except at the neutral position of the control lever 22. The above-described arrangement causes speed device 13-4 to be pressurized by communication with inlet groove 32 of directional selector valve 19 at the neutral position of spool 26 but this does not cause power flow through the transmission 12 inasmuch as neither of the directional clutches 13-F and 13-R is pressurized at that spool position as will hereinafter be described in more detail. The purpose of this arrangement will be hereinafter explained in connection with the operation of the system.

The directional selector valve 19 is provided with additional groove 49 and spool lands 51 arranged to pressurize device 13-F while venting device 13-R at the forward drive setting of spool 26 and to pressurize device 13-R and vent device 13-F at the reverse setting of the spool. Pressurized fluid for this purpose is received at groove 49i through a secondary supply conduit 52 connected with a safety differential valve assembly 53.

Accordingly, it may be seen that at any selected position of the shift lever 22 other than neutral, an individual one of the speed devices 13-1, 13-2, 13-3 and 13-4 is pressurized, while the others thereof are vented, and an individual one of the directional devices 13-F and 13-R is pressurized while the other thereof is vented. At the neutral setting of the control lever 22, only speed device 13-4 is pressurized and this is insufficient to establish a complete power path through the transmission.

To efficiently shift the transmission 12 while avoiding severe shock loads and in order to reduce wear of the clutches or brakes which constitute the drive establishing devices 13, and for safety purpose, the control system must provide certain further functions additional to that of merely directing pressurized fluid to appropriate drive establishing devices. Considering a first such function, the rise of pressure at the selected ones of the devices 13 must be somewhat gradual and the final pressure must be matched to the capacities of the devices. This is provided for by a modulating relief valve assembly 54, which has a housing 56 with a bore 57 in which a spool 58 is disposed for axial movement.

An inlet groove 59 of bore 57 is communicated with the pressurized fluid supply line 61 which extends between pump 14 and flow restriction 33. An adjacent outlet groove 62 is communicated to drain, in this instance through the vehicle torque converter 63 as the discharge from valve 54 is utilized to provide fluid to the torque converter. Spool 58 is urged towards one end 64 of bore 57 by a spring 66 which reacts against a load piston 67 situated near the opposite end of the bore. A vent groove 68 is provided in the middle region of bore 57 between spool 58 and piston 67 and a load piston chamber groove 69 is situated near the end opposite end 64 and communicated with a flow passage 71 into which pressurized fluid may be received to shift the load piston towards spool 58 and therby increase the force which spring 66 exerts on the spool.

Spool 58 is provided with an edge 72 positioned to block communication between inlet groove 59 and outlet groove 62 when the spool is in contact with end 64 of the bore. Modulation valve 54 functions to regulate the system pressure by controllably releasing fluid from inlet groove 59 to outlet groove 62 across spool edge 72. For this purpose, a chamber 70 is provided in the end of spool 58 adjacent bore end 64 and radial passages 73 in the spool transmit fluid pressure from inlet groove 59 thereto. Thus, the system pressure acting against a reaction slug 74 disposed in chamber 70, urges the spool away from bore end 64 with a force proportional to the magnitude of the instaneous system pressure. This force is opposed by that of spring 66 and the spring force is a function of the position of load piston 67 in bore 57.

Whenever the selector valves 19 or 21 are operated to initiate a shift of the transmission, a previously unpressurized one of the speed devices 13 is communicated with the outlet of pump 17. This occurs even if only a shift of the directional valve 19 is made because of the above described connection of device 13-4 thereto. Thus any shift starts with a momentary drop in system pressure to a low value since a device 13 is equivalent to a drain until it fills with fluid. If the modulation valve 54 were not present, there would be an abrupt increase of pressuure at the selected devices 13 when the filling stage was completed.

Figure 2:
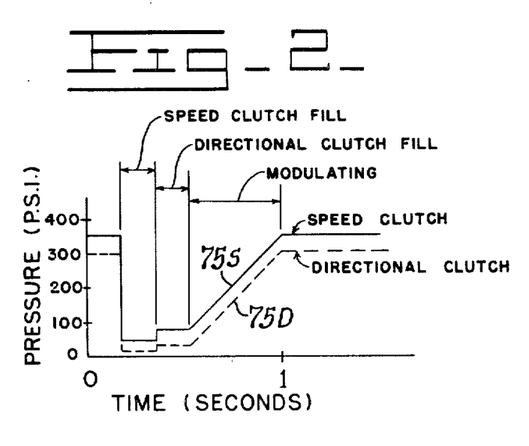
FIG. 2 is a graphical illustration of changes of fluid pressure as a function of time in the drive establishing devices of the transmission following a shift of the operator's control lever.

A more gradual rise is provided by the modulation valve 54 as depicted in FIG. 2 wherein line 75S indicates pressure at the selected speed device and line 75D indicates pressure at the directional device. Referring again to FIG. 1, the initial low pressure acting within spool chamber 70 is sufficient to shift the spool away from bore end 64 and thereby cause a release of fluid past spool edge 72 to outlet groove 62. The subsequent gradual rise of system pressure is brought about by admitting fluid to groove 69, by means to be hereinafter described, to cause the load piston 67 to shift towards spool 58 thereby gradually increasing the pressure which spring 66 exerts on the spool. As the load piston 67 shifts towards spool 58 in this manner, an increasingly higher system pressure must build up in spool chamber 70 before fluid can flow to drain past edge 72. The piston movement ends when a vent 68a in housing 56 is uncovered and an equilibrium state is reached at which the force of spring 66 on spool 58 is matched by the opposed fluid pressure thereon, at which point the modulation valve 54 maintains the system pressure at a fixed high level.

Operation of the modulation valve 54 in the foregoing manner requires that an increasing fluid pressure be applied behind the load piston 67. For safety reasons, it is also desirable that system pressure be maintained at a low value which is insufficient to establish drive through the transmission 12 if the pump 14 is first started up with the shift lever 22 at some position other than neutral, since under that condition a sudden unexpected violent movement of the vehicle could occur. Still further, it is desirable that the transmission 12 be effectively put into a neutral condition in response to a braking signal, regardless of the position of the shift lever 22, when the brakes of the vehicle are being applied. In the absence of such means, the brakes must work against the drive system of the vehicle which condition both decreases the effectiveness of the brakes and accelerates wear of the brakes. Still further, the two directional drive establishing devices 13-F and 13-R have a more massive and wear resistant construction than the speed ratio determining devices 13-1 to 13-4 and provisions should be present for engaging the directional and device slightly after engagement of the speed device so that it is always one of the higher capacity directional devices which sustains the shock and wear of reestablishing torque flow through the transmission 12 at the completion of a shift. This means that the rise of pressure at the directional device 13-F or 13-R must be delayed relative to the rise of pressure at the speed device 13-1 to 13-4. Finally, owing to the higher capacity of the directional devices 13-F and 13-R, the maximum fluid pressure applied thereto should be somewhat less than the maximum pressure applied to the speed determining devices 13-1 to 13-4. Each of the foregoing functions is accomplished by the single spool safety differential valve assembly 53 of the present invention without external complication of the circuit.

Safety differential valve 53 may have a housing 76 with a bore 77 having a valve spool 78 slideably disposed therein. A spring 79 in bore 77 urges the spool 78 towards one end 81 of the bore. An inlet groove 82 is provided in bore 77 and is communicated with the fluid supply conduit 20. In order to shift the load piston 67 of modulating valve 54 to produce a gradual pressure rise in the system at the conclusion of a shift as previously described, inlet groove 82 of valve 53 is communicated with the previously described load piston chamber 69 of valve 54 through another flow restriction 83. Load piston chamber 69 is also communicated with an additional groove 84 of safety differential valve 53, independently of the flow restriction 83, to enable release of the fluid pressure behind the load piston to reset the system to a low pressure at the beginning of each shift as will hereinafter be described in more detail.

To supply fluid to the selected directional device 13-F or 13-R during each shift, bore 77 of valve 53 has an outlet groove 86 situated between groove 82 and 84 which is communicated with inlet groove 49i of directional selector valve 19. Bore 77 of valve 53 further has a braking signal receiving groove 87 in proximity to the end 81 of bore 77, a drain groove 88 in proximity to the other end of the bore and still another groove 89 situated between grooves 82 and 87 and communicated with groove 49a of directional selector valve 19 to sense when the valve 19 is at the neutral setting as will be hereinafter described in more detail.

In order to shift the spool 78 away from bore end 81 against the action of spring 79, a chamber 91 is formed in the adjacent end of the spool and fluid pressure is admitted thereto from inlet groove 82 through a radially directed constricted flow passage 92 in the spool which communicates with chamber 91 through an axial spool passage 93 and through a check valve 94 that blocks reverse flow through passage 93. To accelerate the movement of the valve spool away from bore end 81 after a small initial amount of travel, an additional and larger radial passage 96 extends radially within the spool from passage 93 in position to be communicated with inlet groove 82 after the small initial amount of spool travel.

To prevent movement of the safety differential valve spool 78 in the event that the pump 14 of the vehicle should be started up with the directional selector valve 19 at a position other than neutral, additional radial passages 97 are provided in the spool to communicate chamber 91 with groove 89 when the spool is in proximity to bore end 81, the groove 89 being connected to drain through groove 49a of directional selector valve spool 19 at any position of the directional selector valve other than neutral.

Figure 3:
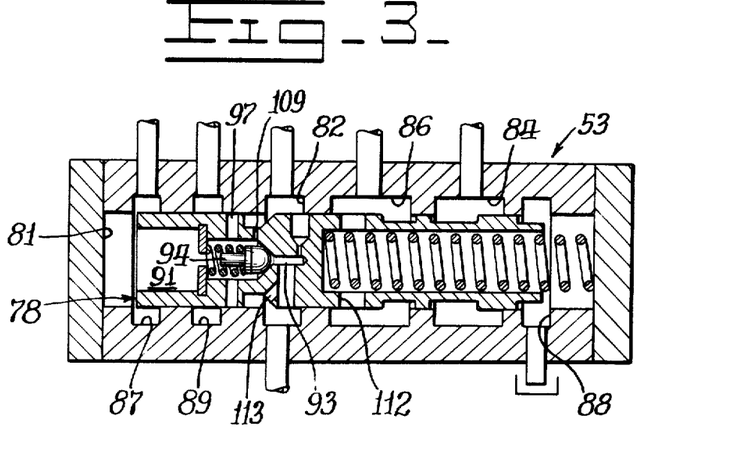
FIG. 3 depicts the position of elements of the differential valve assembly when the transmission is automatically neutralized in response to a braking signal or the like, FIG. 4 depicts the position of elements of the differential valve assembly at a first intermediate stage in the course of a transmission shift.

To provide for forced neutralization of the transmission 12 when the brake system 18 is activated, regardless of the position of the selector valves 19 and 21, braking signal receiving groove 87 of the safety differential valve is communicated with some means on the vehicle which is depressurized when the brakes are applied. This may, for example, be an inlet groove 98 in a bore 99 of a brake signal valve 101. Valve 101 has an outlet groove 102 and a spool 103 normally biased by a spring 104 to a position at which grooves 98 and 102 are isolated from each other. An end inlet 106 of valve 101 is communicated with the vehicle brake system pressure line 107 so that upon activation of the vehicle brakes, spool 103 is shifted against spring 104 to communicate grooves 98 and 102. This in turn vents chamber 91 of the safety differential valve 53, if the spool 78 is away from end 81 of bore 77, thereby causing the spool to be returned a limited distance in the direction of bore end 81 as depicted in FIG. 3 to vent the engaged one of the directional devices 13-R and 13-F.

Figure 4:
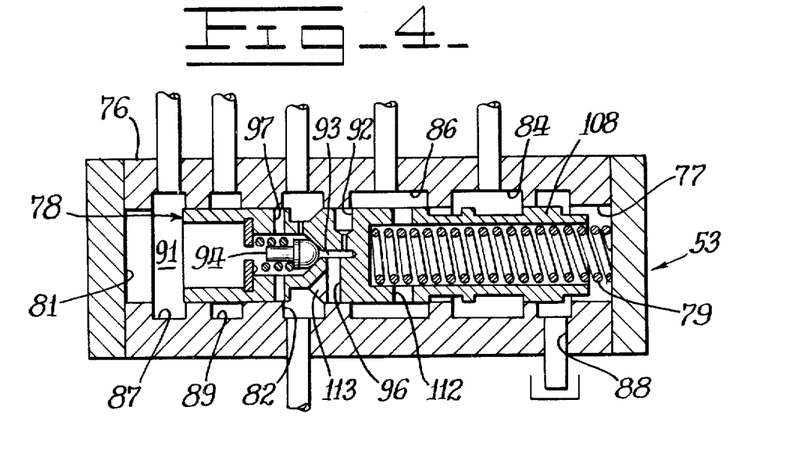
Figure 7:
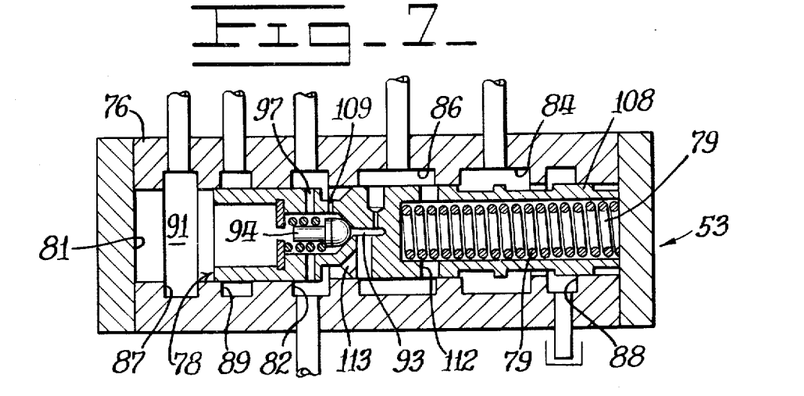
FIG. 7 depicts the position of elements of the differential valve assembly at another intermediate stage of shifting of the transmission.

Considering now the operation of the above described system, FIG. 1 depicts the position of elements of the system in its unpressurized condition, when pump 14 is not operating, and with the directional selector valve 19 at the neutral setting and the speed selector valve 21 at the first speed setting. Upon startup of the pump 14, with directional selector valve 19 at the neutral position, fluid is initially directed through the supply conduit 61 and flow restriction 33 to grooves 32 and 48 of the directional selector valve. Thus filling of device 13-4 begins. As the device 13-4 absorbs the full flow through restriction 33, no sizeable fluid pressure is transmitted to load piston chamber 69 of the modulation valve during this period, and thus the system pressure temporarily remains low. When filling of device 13-4 is completed, pressure increases at inlet groove 82 of the safety differential valve 53. The pressure rise is transmitted to spool chamber 91 through flow passages 92 and 93 and check valve 94 causing the valve spool 78 to move away from bore end 81. This spool movement is accelerated when the larger spool passage 96 is brought into register with inlet groove 82 and the spool is further shifted to the position depicted in FIG. 4 at which chamber 91 is communicated with inlet groove 82 independently of the check valve 94 through radial passages 97. Subsequently, spool 78 reaches the end of bore 81 as depicted in FIG. 7 at which point a land 108 on the spool has blocked communication of groove the spring chamber of the spool with drain groove 88 thereby enabling pressure to rise in the spring chamber. This rising pressure acting within the safety differential valve spool 78 returns spool 78 from the position depicted in FIG. 7 towards a normal operating position shown in FIG. 5.

Concurrent with this action of the safety differential valve 53, a rise in fluid pressure is transmitted to the inlet groove 59 of modulating relief valve 54 causing the spool 58 thereof to shift away from bore end 64 to enable fluid to be metered past edge 72 to maintain a predetermined pressure in the system. This predetermined pressure rises gradually after the above described movement of spool 78 towards the FIG. 5 position which blocks groove 84 from drain groove 88 of the safety differential valve as fluid is then transmitted to the load piston chamber 69 causing the load piston to shift towards spool 58 thereby gradually increasing the spring pressure thereon. At the normal operating position shown in FIG. 5 an edge 78a of land 108 releases fluid to drain groove 88 as necessary to maintain a pressure differential between grooves 82 and 86. The pressure behind the load piston continues to rise at a rate controlled by the flow limiting effect of restriction 83 and thus the system pressure as a whole is gradually raised to a maximum value at which the fluid forces acting to shift modulating relief valve spool 58 against spring 66 are balanced by the spring force and load piston pressure thereon. At the completion of this phase of operation, only device 13-4 is pressurized as may be seen in FIG. 6 wherein lines 75s' and 75D' indicate pressure changes in the speed and directional devices respectively at startup in neutral. As the directional selector valve is at the neutral setting, inlet groove 49i is blocked, both directional devices 13-F and 13-R are vented to drain and no complete power path exists through the transmission 12.

With the system in the pressurized condition described above, a shift of the transmission 12 may be brought about by operating shift lever 22 to shift the directional valve spool 26 into either the forward or reverse drive positions and to set speed selector valve at a desired speed position. For purpose of illustrating the action of the system during a shift, it will be assumed that the directional valve spool 26 is shifted into the forward drive position and that the speed selector valve spool 29 is maintained at the first speed position thereof, the operation of the system being essentially similar if reverse drive or other speed settings are selected.

Upon shifting of the directional valve spool 26 to the forward drive position, there is an immediate pressure drop at the outlet side of flow constriction 33 inasmuch as the fluid flow must first fill the previously drained device 13-1 through directional selector valve grooves 32 and 34 and speed selector valve grooves 37 and 39a. The previously pressurized device 13-4 is now vented through directional selector valve spool grooves 48 and 46, conduit 44, and speed selector valve grooves 42a and 42b. This pressure drop at the outlet of flow constriction 33 reduces the pressure within chamber 91 of the safety differential valve spool 78 through radial passages 97 causing the spool to return from the FIG. 5 position to the FIG. 4 position. Upon completion of filling of the selected speed device 13-1, pressure again rises at safety differential valve inlet 82. The rising pressure is transmitted to chamber 91 of the safety differential valve through inlet aperture 82, an angled passage 113 in spool 78, passage 93, and check valve 94. This travels spool 78 to the position depicted in FIG. 7 at which a rapid flow of fluid to fill the directional device 13-F is provided from the safety differential valve inlet groove 82 through angled passage 113 and passages 96, 93, 92 and 112. It may be observed that the pressure modulating valve load piston chamber 69 is vented to drain groove 88 at this position of the safety differential valve spool, past land 108, and thus the pressure modulating valve 54 is reset.

Upon completion of filling of device 13-F, the pressure in outlet groove 86 of the safety differential valve begins rising and the rising pressure is transmitted through passages 112 to supplement the force of spring 79 on the spool. This shifts the spool 78 back to the normal operating position depicted in FIG. 5, at which a differential valve action is provided as previously described to maintain the pressure in the directional device 13-F at a predetermined lesser value than the pressure at directional device 13-1.

Following completion of the directional clutch fill, and reshifting of spool 78 as described above, fluid is transmitted to the load piston chamber 69 of the modulating relief valve 54 which then operates in the manner previously described to produce a gradual rise of system pressure to a predetermined high value, as depicted in FIG. 2. Referring again to FIG. 1, when this operating pressure has beenn reached, at which the devices 13-F and 13-1 are fully engaged and transmission 12 is transmitting torque, pressure modulating valve 54 meters fluid across edge 72 to maintain the basic system pressure while safety differential valve 53 transmits fluid from groove 82 to groove 86 and releases fluid past edge 78a as necessary to maintain a lesser predetermined pressure at the directional device 13-F.

Upon any subsequent shifting of the directional selector valve 19 and/or the speed selector valve 21, an essentially similar resetting of the pressure modulation valve 54 and a similar operation of the safety differential valve 53 occurs to produce the desired gradual pressure rises at the newly selected device 13.

Figure 5:
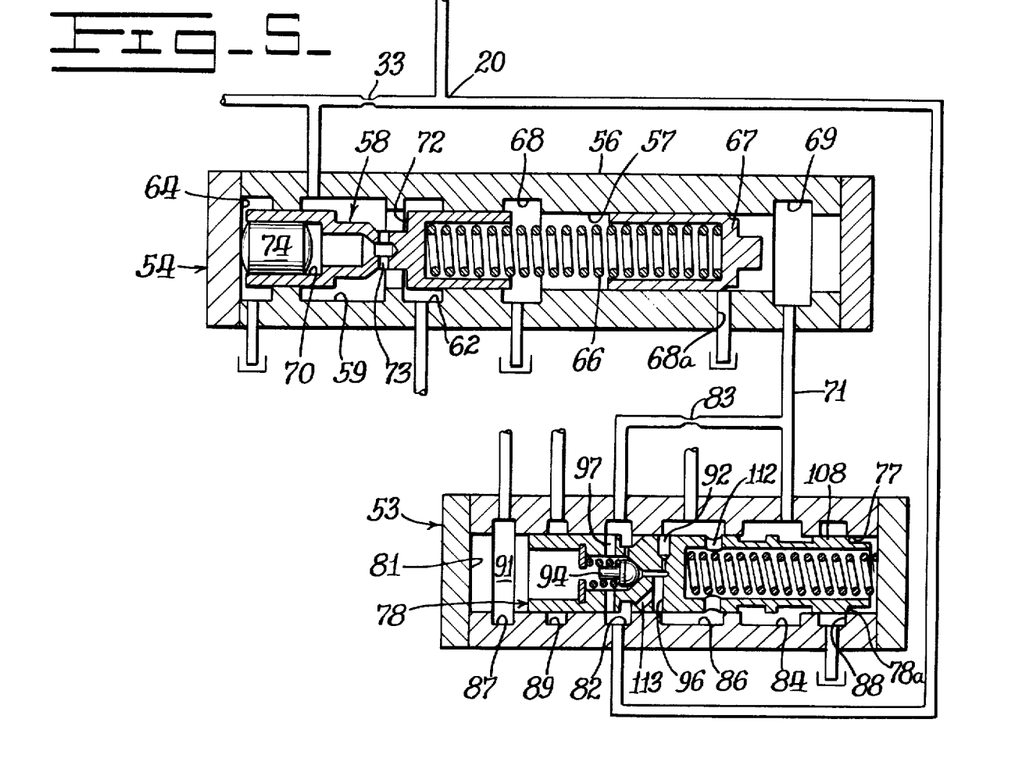
FIG. 5 illustrates the modulating valve assembly and the differential valve assembly of the system of FIG. 1 with elements shown shifted to the positions which are assumed following completion of a shift of the associated transmission.
Figure 6:
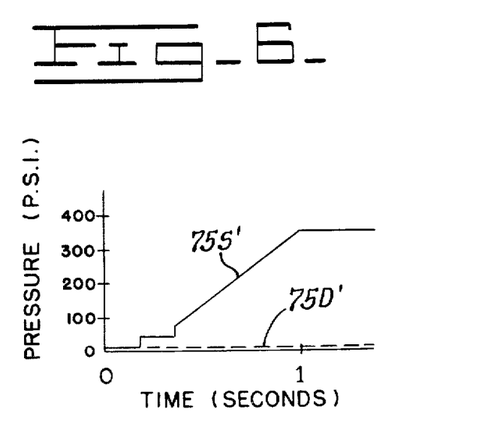
FIG. 6 is a graphical illustration of fluid pressures in the drive establishing devices as a function of time following start-up of the system with the shift lever at the neutral position.

Opening of the valve 101 in response to brake fluid pressure as previously described, with safety differential valve spool 78 in the normal operating position of FIG. 5 at which torque is transmitted through transmission 12, vents spool chamber 91 enabling the spring 79 and the fluid pressure present in the spring region to shift the spool a limited amount towards bore end 81 to the position depicted in FIG. 3. At the FIG. 3 position, a small flow of fluid continues to be directed to the load piston chamber 69 of the pressure modulation valve to maintain full system pressure, but at the same time, groove 86 and thus the previously actuated one of the directional devices 13-F and 13-R is vented to drain through spool passages 112 and drain groove 88. Under this condition, a small amount of fluid from groove 82 is admitted into chamber 91 through flow orifice 109 and passages 93, 96 and check valve 94 and metered to drain past the end of the spool through groove 87 and the now opened neutralizer valve 101. This assures that chamber 91 remains filled in order to respond quickly to the subsequent closing of neutralizer valve 101. When the brake fluid pressure at neutralizer valve 101 is removed, valve 101 reverts to the closed state. Spool chamber 91 is repressurized causing the spool 78 to shift again to the FIG. 7 position at which the pressure modulation valve is reset by venting of the pressure behind the load piston thereof and at which the directional device 13-F or 13-R begins refilling in the manner previously described. Cycling of the system to reestablish drive through the transmission 12 the proceeds as previously described except insofar as the modulated pressure rise phase of the cycle begins sooner since the selected speed device 13-1 to 13-4 had remained filled with fluid and thus requires no appreciable fill time.

The system further provides for preventing actuation of either of the directional devices 13-F or 13-R in the event that the fluid pump 14 is first started up with the operators shift control lever 22 at a position other than neutral. Upon a startup under this condition, groove 49a of the directional selector valve 19 is communicated with drain through grooves 49b or 49 c depending on whether the valve is positioned in the forward or reverse setting. The vented groove 49a is in turn communicated with groove 89 of the safety differential valve 53 which groove is in turn communicated with spool chamber 91 through radial passages 97. Thus, no pressure buildup can occur in spool chamber 91 and the spool 78 does not shift away from bore end 81 to enable pressurization of either of the directional devices 13-F or 13-R. Filling of the selected one of the speed devices 13-1 to 13-4 will proceed but the pressure therein will not rise toward the maximum value as the load piston chamber 69 of modulating relief valve 54 is vented through drain groove 88 of the safety differential valve. In order to establish drive through the transmission 12 under this condition, the operator must first reposition the shift control lever 22 to the neutral position at least momentarily. Momentary repositioning of lever 22 to neutral blocks the drain path through groove 49a of the directional selector valve 19 enabling pressure to build up in chamber 91 of the safety differential valve 53. This buildup of pressure in chamber 91 rapidly shifts the spool 78 away from bore end 81 to ready the system for a shift cycle as previously described.

Accordingly, the several transmission control functions are all accomplished with four spool valve assemblies 19, 21, 53, and 54 each requiring only a single valve spool and each having a housing wherein only a single straight bore need be machined to precise tolerances.

While the invention has been described with respect to a specific embodiment, it will be apparent that many variations are possible and it is not intended to limit the invention except as defined in the following claims:

What is claimed is:

1. A fluid circuit for shifting a multispeed transmission having a first and second group of fluid pressure actuated drive establishing devices, wherein at least one of said first group of devices is pressurized to select the drive ratio through said transmission while at least one of said second group of devices is pressurized to select the drive direction through said transmission, comprising:
a source of pressurized fluid,
a speed delector valve receiving pressurized fluid from said source through a first flow path and having means moveable to direct said fluid to any selected one of said first group of devices,
a directional selector valve having an inlet for receiving pressurized fluid and having valve means moveable to direct fluid from said inlet to any selected one of said second group of devices and being moveable to a neutral setting,
a pressure modulating valve having an inlet communicated with said first flow path, and having flow controlling means moveable to control the pressure of fluid in said first flow path and further having modulating means shiftable to exert a changing force on said flow controlling means for gradually raising said fluid pressure in said flow path,
means forming a constricted fluid passage from said first flow path to said modulating means of said pressure modulating valve for gradually shifting said modulating means in response to rising fluid pressure in said first flow path, and
a safety differential valve having an inlet communicated with said first flow path and having an outlet communicated with said inlet of said directional selector valve and having a valve member moveable to control fluid flow from said inlet to said outlet, said safety differential valve having resilient means for uring said valve member towards a first position at which flow from said inlet to said outlet is blocked and having means for causing fluid pressure from said inlet to urge said valve member away from said first position towards a fluid metering position at which fluid may pass from said inlet to said outlet and having means for causing fluid pressure from said outlet to supplement the force of said resilient means on said valve member when said valve member is at said metering position whereby the pressure at said outlet is caused to have a predetermined relationship to the pressure at said inlet,
said safety differential valve further having means on said valve member thereof for relieving said fluid pressure at said outlet when said valve member shifts from said metering position towards said first position in response to a predetermined pressure drop at said inlet and having reset means on said valve member for relieving said fluid pressure on said modulating means when said valve member shifts in the opposite direction past said metering position in response to a subsequent pressure rise at said inlet following said relief of said pressure at said outlet.

2. The combination defined in claim 1 wherein said reset means of said safety differential valve is communicated with said modulating means of said pressure modulating valve through a flow passage of greater flow capacity than said constricted passage from said first flow path to said modulating means.

3. The combination defined in claim 1 wherein said directional selector valve includes a portion of said first flow path from said source to said speed selector valve and also forms a portion of the flow passage from said speed selector valve to at least one of said first group of devices, and wherein said movable valve means of said directional selector valve has means for blocking said flow passage from said speed selector valve to said one device while communicating said one device directly with said first flow path when said directional selector valve is shifted to said neutral setting--.

4. The combination defined in claim 1 wherein said means for causing said inlet fluid pressure to urge said valve member of said safety differential valve away from said first position includes means forming a chamber in which said inlet fluid pressure acts on said valve member and wherein said safety differential valve has a first region communicated with said chamber only when said valve member is at said first position thereof, and wherein said directional selector valve has means for venting said first region of said safety differential valve when said directional selector valve is at any position other than said neutral position thereof whereby said valve member of said safety differential valve is maintained at said first position thereof if said source of pressurized fluid is started up while said directional selector valve is at a position other than said neutral position thereof.

5. The combination defined in claim 4 wherein said safety differential valve has a second region communicated with said chamber when said valve member is away from said first position thereof, further comprising means for venting said second region in response to a fluid pressure signal from an external source whereby said valve member is shifted towards said first position thereof thereby venting any pressurized one of said second group of devices to neutralize said transmission in response to said fluid pressure signal.

6. The combination defined in claim 5 further comprising means on said valve member for relieving said fluid pressure on said modulating means when said valve member is at said first position thereof.

7. The combination defined in claim 6 further comprising means on said valve member for blocking communication between said chamber and said second region as said valve member moves a predetermined distance from said metering position towards said first position in response to said venting of said second region, said predetermined movement being greater than that required to cause relief of said pressure on said modulating means whereby the fluid pressure in said first flow path is maintained while said second group of devices are vented in response to said fluid pressure signal.

8. The combination defined in claim 1 wherein said safety differential valve comprises a housing having a bore therein and having an inlet groove and a spaced apart outlet groove at said bore constituting said inlet and outlet respectively and having a drain groove at said bore spaced on the opposite side of said outlet groove from said inlet groove, and a valve spool movable axially in said bore and constituting said movable valve member, said spool having a first internal passage means communicating said inlet groove with the end of said bore opposite from said drain groove, a second internal passage communicating said inlet groove with said outlet groove when said spool is shifted to said metering position thereof, and having land and groove means blocking said outlet groove from said drain groove when said spool is at said metering position and when said spool has shifted to relieve said pressure on said modulating means and communicating said outlet groove with said drain groove at other positions of said spool.

9. The combination defined in claim 8 wherein said first internal passage means includes a constricted passage extending from said inlet groove to said bore and when said spool is at said first position, a larger passage extending from said inlet groove to said bore end only after said spool has shifted a small distance away from said first position, check valve means carried in said spool and limiting flow through said constricted passage and said larger passage to a flow direction towards said bore end, and an additional internal passage in said spool positioned to communicate said inlet groove with said bore end independently of said check valve at said metering position of said spool.

10. The combination defined in claim 8 wherein said housing has an additional groove at said bore and said spool has an additional passage communicating said inlet groove with said additional groove when said spool is at said first position, and wherein said directional selector valve has means communicated with said additional groove for venting said additional groove except when said directional selector valve is at said neutral position.

* * * * *